US006745543B2

(12) United States Patent
Tillack et al.

(10) Patent No.: US 6,745,543 B2
(45) Date of Patent: Jun. 8, 2004

(54) APPARATUS FOR FORMING AND/OR SEALING A PACKAGING UNIT

(75) Inventors: Bernd Tillack, Grevesmuehlen (DE); Norbert Dietrich, Hennef (DE); Hans Bernd Dreier, Rheda-Wiedenbrueck (DE)

(73) Assignee: Grief-Velox Maschinenfabrik GmbH, Luebeck (DE)

( * ) Notice: Subject to any disclaimer, the term of this patent is extended or adjusted under 35 U.S.C. 154(b) by 64 days.

(21) Appl. No.: 10/150,925

(22) Filed: May 21, 2002

(65) Prior Publication Data

US 2003/0217530 A1 Nov. 27, 2003

(51) Int. Cl.$^7$ ................................................ B65B 7/00
(52) U.S. Cl. ...................................... 53/374.8; 53/469
(58) Field of Search ..................... 53/469, 479, 284.7, 53/373.7, 552, 374.8, 374.6, 371.6, 371.8; 83/171

(56) References Cited

U.S. PATENT DOCUMENTS

| | | |
|---|---|---|
| 3,697,357 A | 10/1972 | Obeda |
| 4,157,719 A | 6/1979 | DeWoskin |
| 4,517,790 A * | 5/1985 | Kreager ........................ 53/552 |
| 5,007,233 A * | 4/1991 | Bose ............................ 53/449 |
| 5,110,040 A | 5/1992 | Kalberer et al. |
| 5,437,141 A | 8/1995 | Baumann |
| 5,463,851 A * | 11/1995 | Nagai .......................... 53/552 |
| 6,047,522 A * | 4/2000 | Huang ....................... 53/373.7 |

FOREIGN PATENT DOCUMENTS

| | | |
|---|---|---|
| DE | 39 41 015 A1 | 6/1990 |
| DE | 42 33 878 A1 | 4/1994 |
| DE | 295 15 852 U1 | 11/1995 |

OTHER PUBLICATIONS

"Verschliessen mit Ultraschall;" Verfahrenstechnik; Dec. 13, 2000; pp. 12–13; vol. 34 Issue 12; Germany.
XP002177486; Database WPI; Section Ch, Week 197420; Derwent Publications Ltd., London, GB; AN 1974–37645V.
Akuwa Fumio; Patent Abstracts of Japan, Publication No. 11104216, Apr. 20, 1999; Application No. 09273152, Jun. 10, 1997.

* cited by examiner

Primary Examiner—Rinaldi I. Rada
Assistant Examiner—John Paradiso
(74) Attorney, Agent, or Firm—Lawrence E. Laubscher, Sr.

(57) ABSTRACT

The present invention refers to an apparatus and a method for forming a packaging unit consisting of an endless hose, or for sealing a prefabricated packaging unit, comprising an ultrasonic welding device including an anvil and a sonotrode, which are movable towards each other, and a means for positioning the hose material to be welded between the anvil and the sonotrode. In accordance with the present invention it is suggested that the anvil comprises two anvil parts which are movable relative to one another in the direction of the sonotrode, one of said anvil parts being implemented as a sealing anvil and the other part being implemented as a separating anvil. Hence, the apparatus according to the present invention permits the production of packaging units which end directly at the weld, i.e. in the case of which no length section of the foil material projects outwardly beyond the weld. The method according to the present invention is characterized in that the material of the endless hose or of the packaging unit projecting beyond the weld is cut off directly adjacent to or in said weld.

7 Claims, 3 Drawing Sheets

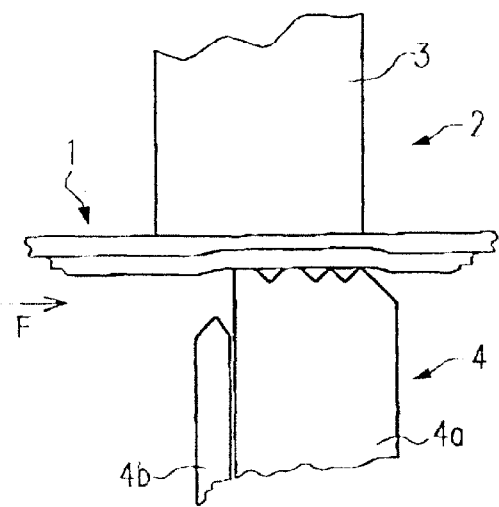
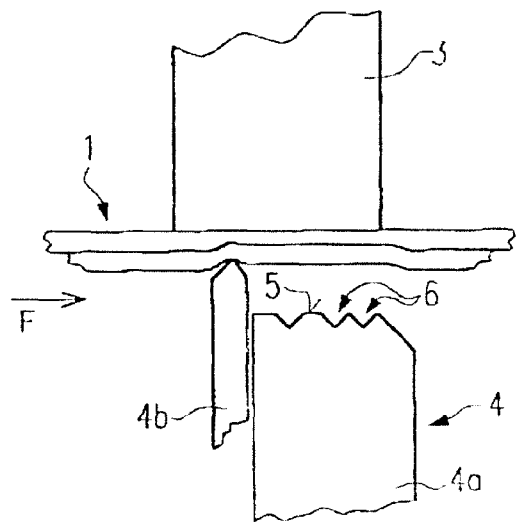
FIG. 1a  FIG. 1b
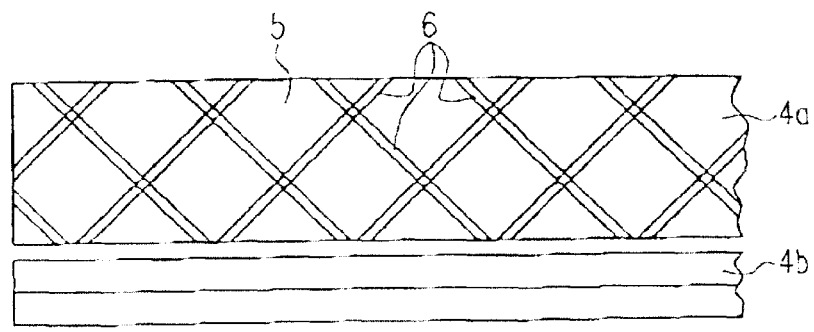
FIG. 2

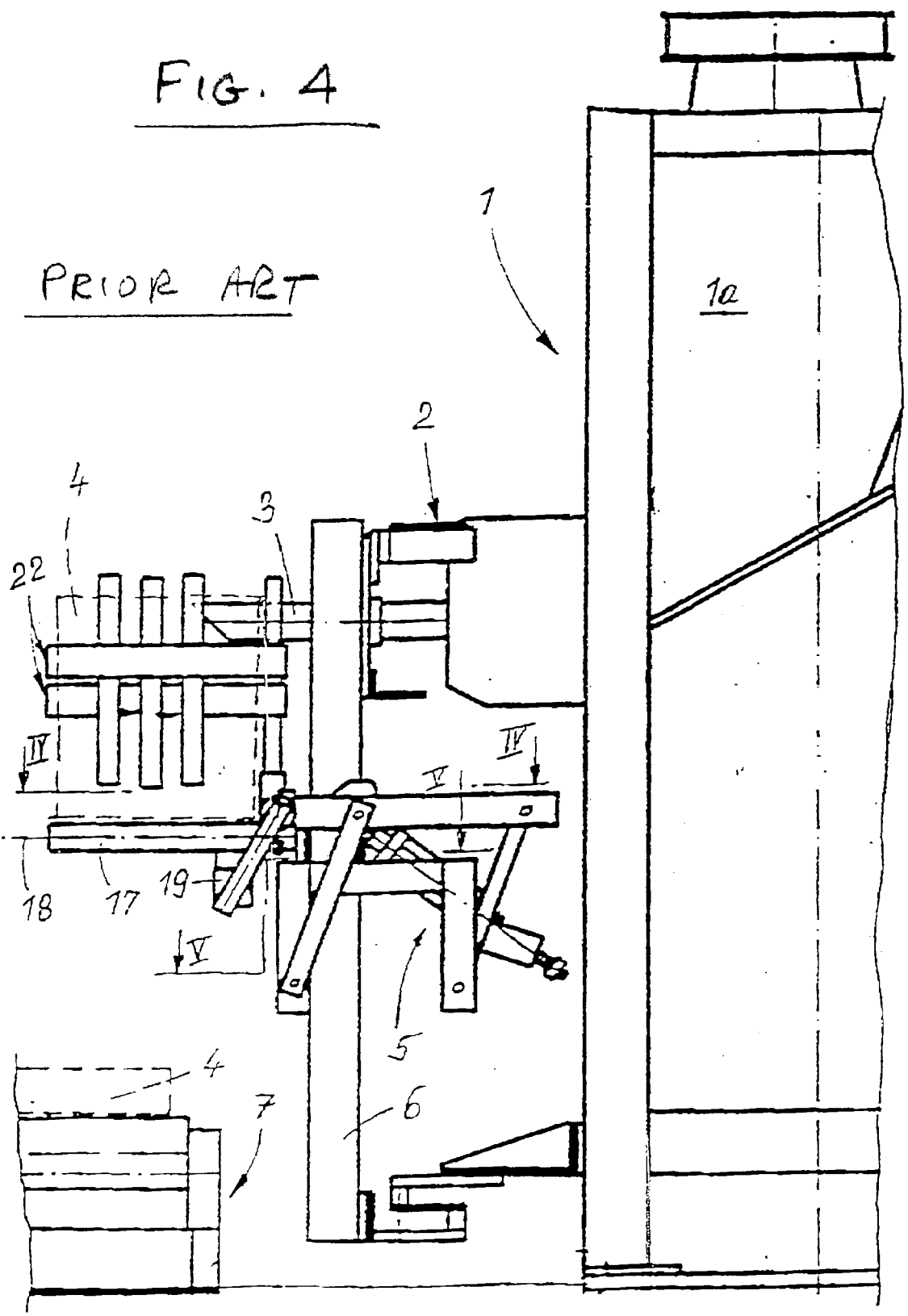

APPARATUS FOR FORMING AND/OR SEALING A PACKAGING UNIT

BACKGROUND OF THE INVENTION

1. Field of the Invention

The present invention relates to an apparatus for forming a packaging unit consisting of an endless hose or for sealing a prefabricated packaging unit, in particular a bag for loose material, said apparatus comprising an ultrasonic welding device including an anvil and a sonotrode, which are movable towards each other, and a means for positioning the hose material to be welded between the anvil and the sonotrode, The present invention additionally relates to a method for forming and/or sealing a packaging unit.

2. Brief Description of the Prior Art

An apparatus according to the generic clause as well as a method are described in the article "Verschließen mit Ultraschall" ("sealing with ultrasound") of the applicant of the present patent application in the periodical "Verfahrenstechnik" 34 (2000), No. 12, pp. 12–13. This article describes various ultrasonic welding devices, e.g. for welding a valve bag in the area of its valve, said valve bag being first pushed onto a filler neck, filled with a loose material, and, subsequently, it is removed from the filler neck. These valve bags are prefabricated packaging units which are sealed in the above-described apparatus.

An ultrasonic welding device is, however, also known for forming a packaging unit consisting of an endless hose. In the so-called FFS (form-fill-seal) method a gusset-type hose or a hose without a gusset is unwound from a roll. A predetermined length piece is cut off from the endless material supplied, and sealed at the location of separation by conventional welding. The thus produced bag for loose material, which is open at the top, is first deposited in a place of intermediate deposit. Here, the weld cools down so as to achieve the strength which is necessary for the future filling of the bag for loose material. The prepared bag for loose material is then seized in said place of intermediate deposit and placed below a filling unit such that its opening faces upwards. After the filling operation, the material of the bag for loose material is welded also on the upper side of the bag. For this purpose, the above-mentioned prior art provides an ultrasonic welding device.

This known device used for carrying out the FFS method is, on the one hand, disadvantageous insofar as a place of intermediate deposit is required. On the other hand, the bag for loose material produced according to the FFS method has, at least on the lower side thereof, a length section of the hose material projecting beyond the lower weld at the end of the bag. It should be the aim of the method to produce the highest possible number of bags for loose material from the endless hose material supplied.

In the case of the above-described apparatus for sealing a valve bag after removal of said valve bag from the valve neck, the problem arises that particles, e.g. pigments or toxic particles, may adhere to the inner side of the valve. The particles located between the free end of the projecting valve and the weld may dust off during future handling. This cannot be desirable in the case of toxic substances. Paint pigments dusting off lead to a very intensive colouring of the surroundings, which is not desirable either.

SUMMARY OF THE INVENTION

It is the object of the present invention to provide an apparatus of the type mentioned at the start, in the case of which the above-described problems do not exist. For the so-called FFS method, for example, an apparatus is to be provided by means of which the endless material supplied is utilized in the best possible way for producing the bags for loose material. In addition, particles adhering to the valve are to be prevented from dusting off. Hence, it is, in particular, the object of the present invention to further develop the apparatus mentioned at the start in such a way that it can be used for producing packaging units in the case of which length pieces projecting from the weld at the end of respective packaging unit are avoided as far as possible.

It is a further object of the present invention to provide a method in the case of which the endless material supplied is utilized in the best possible way for producing packaging units. Furthermore, the method aims at preventing particles, which adhere to the sealed packaging unit, from dusting off.

For solving the problem as far as the apparatus is concerned, the apparatus mentioned at the beginning is further developed by means of the present invention insofar as the anvil comprises two anvil parts which are movable relative to one another in the direction of the sonotrode, one of said anvil parts being implemented as a sealing anvil and the other part being implemented as a separating anvil.

By means of the apparatus according to the present invention, it is possible to effect sealing and, simultaneously, cutting off directly in, or adjacent to the weld produced by means of ultrasonic welding. The apparatus for sealing especially a valve bag, cuts off the free end, which projects beyond the valve bag, in or directly adjacent to the weld produced by means of ultrasonic welding. It follows that contaminations adhering to the outwardly open residual piece of the valve neck are removed, e.g. sucked off, together with the projecting end piece already at the filling station.

When forming packaging units, in particular bags for loose material, according to the FFS method, the endless material supplied is utilized in the best possible manner by means of the apparatus according to the present invention. The lower end of the bag for loose material is defined by the weld. A length piece of the hose material projecting downwards from said weld does not exist.

For simplifying the structural design of the apparatus according to the present invention, it is suggested that, in accordance with a preferred embodiment, the two anvil parts should essentially be implemented as plate-shaped components, and that the anvil parts should abut on one another with their neighbouring longitudinal sides. The relative movement of the two anvil parts is thus preferably guided via the neighbouring longitudinal sides.

Neat and reliable cutting off of the projecting valve piece as well as cutting off of the predetermined length piece from the endless hose supplied for forming an open bag are supported by the circumstance that the separating anvil is implemented such that it tapers in the direction of the sonotrode.

In particular in cases in which gusset-type hoses are used for producing packaging units, and for the purpose of sealing valve bags, it turned out to be advantageous when the sealing anvil is provided with a pressure surface extending parallel to the end face of the sonotrode, said pressure surface being provided with diagonally intersecting grooves which are distributed over the area thereof. The use of gusset-type hoses entails the problem that four layers have to be welded at the edges of the hose, whereas in the middle only two layers have to be welded. In particular at the transition from the two-layered to the four-layered area, the material of the packaging unit, which is preferably plastic material at least in the area of the weld, should be able to flow to such an extent that the differences in the wall thicknesses can be compensated for. This effect is preferably produced by grooves which are formed on the pressure surface in a diagonally intersecting pattern. The dimensions and the depth of the grooves depend on the thickness of the material used and on the nature of the packaging unit. The depth of the grooves increases when larger wall thickness are used.

In order to simplify the apparatus according to the present invention, it is suggested that at least the sealing anvil should be implemented as an integral component extending over the whole welding length. Surprisingly enough, it turned out that, even in the case of the FFS method, a gusset-type hose can reliably be sealed across its whole width by means of an apparatus having such a simple structural design.

The material to be sealed can be clamped prior to and cut off subsequently to the sealing process more easily in view of the fact that both the sonotrode and the anvil are adapted to be moved towards each other.

For sealing valve bags in the area of their valve after the filling operation, the ultrasonic welding device should be designed so as to obtain the best possible outward appearance of the bags. This means that, when seen in the direction of removal of the bag, the ultrasonic welding device should be arranged before the front end of the filler neck in such a way that the valve projecting laterally beyond the valve bag is in any case welded on the level of the longitudinal valve bag side located adjacent the valve neck, and the free, projecting end of the valve bag is cut off on said level. In accordance with this preferred embodiment of the apparatus according to the present invention, the weld for the valve is produced such that it is located approximately in the same plane as the longitudinal side beyond which the valve projects prior to the filling operation. Also the free end of the valve, which is located directly adjacent the weld, is arranged approximately in the above-mentioned plane. It follows that the sealed valve bag produced in this way has a rectangular contour, when seen in a side view; this type of contour is preferred, especially when the sealed bags are stacked and when a large number of stacked bags is enveloped by means of winding, stretching or shrinking later on.

For solving the problem as far as the method is concerned, the method known e.g. from the above-mentioned article "Verschließen mit Ultraschall" is further developed by the present invention insofar as the material of the endless hose or of the packaging unit projecting beyond the weld is cut off directly adjacent to or in said weld. In the sense of the present invention, "directly adjacent to the weld" means that the projecting material is cut off directly at the edge of the weld. It follows that all the surfaces which project beyond the weld and to which loose material that may perhaps dust off may adhere are removed when the projecting material is being cut off. It follows that it will not be possible that material dusts off from the packaging unit which is in principle closed.

If cutting off is effected in the weld, the hose-shaped residual piece of the valve is closed on one side thereof, by way of example; this will also reduce the risk that particles dust off from this cut-off part of the valve bag. It is e.g. imaginable that, in the case of highly toxic particles or particles having a strong colouring power, the projecting end is, one the one hand, sealed in the area of the weld to the packaging unit by carrying out a cut in said weld and that, on the other hand, the front, outer end of the valve, which is first pushed onto the filler neck, is sealed through other effective measures, e.g. by ultrasonic welding; this sealing should, as far as possible, be effected before the projecting material is cut off. It follows that a hose section of the valve, which is sealed on both sides, is cut off from the packaging unit. In accordance with this preferred embodiment, particles cannot dust off—neither from the sealed valve bag nor from the residual piece that has been cut off.

If the method according to the present invention is used for forming packaging units from an endless hose, the endless material, which is supplied for this purpose cyclically and in the form of identical length sections so as to form identically sized packaging units, is utilized in the best possible way. An edge projecting outwards beyond the weld will not exist, provided that the projecting material is cut off directly adjacent to the weld. A location of separation produced in this way forms the opening for the packaging unit cut off from the endless hose in the next step. Even in cases in which packaging units are produced from an endless hose supplied, it is possible to cut off the projecting material in the weld. In accordance with this preferred embodiment, two packaging units are sealed on at least one side thereof, when the endless material is welded at the location in question. This will increase the rate of production of prepared packaging units.

In the case of the method according to the present invention, the projecting material can be cut off by any cutting means, e.g. also by a blade which is adapted to be moved along the location of separation to be created. Such a blade will, however, become blunt, when it is used continuously. In accordance with a preferred embodiment of the method according to the present invention, it is therefore suggested that the projecting material should be cut off by means of an ultrasonic pulse. Surprisingly enough, it turned out that, when cutting off is effected by means of ultrasonic welding, the double-layer material of the packaging unit can be cut through without interconnecting the two layers in such a way that a subsequent spreading apart of the layers for subsequent filling of the packaging unit is made impossible. Other than in the case of movable blades, a separating anvil, which is used for cutting off by means of ultrasound, need not be resharpened at regular intervals.

The structural outlay required for producing an apparatus which is suitable for carrying out the present method is reduced still further by the circumstance that, in the case of the method according to the present invention, the projecting material is preferably cut off by at least part of the same ultrasonic device which is also used for producing the weld. For forming the weld and for cutting off the projecting material, identical parts of an ultrasonic device can be used. When the method is executed in this way, the intensity of the ultrasonic pulse and/or of the contact pressure and the length of the period in which the material is acted upon by the ultrasonic device can be used for controlling whether the opposed layers of the endless material are to be welded together or whether the projecting material is to be cut off.

With respect to the simplest possible control of the ultrasonic device, it should, however, be preferred to use for the welding as well as for the cutting operation a common sonotrode as part of the ultrasonic device, whereas, for the purpose of cutting, a separating anvil should be pressed against the sonotrode and, for the purpose of welding, a sealing anvil should be pressed against the sonotrode, the material being positioned between the sonotrode and the respective anvil.

If the method according to the present invention is used for sealing prefabricated packaging units which consist of a valve bag, an end-piece-free peripheral surface can be formed in accordance with a further preferred embodiment, provided that the valve projecting laterally beyond the valve bag is cut off at a point located on a vertical applied to the longitudinal side of the upright valve bag, or behind said vertical when seen in the direction of the valve bag. In the prior art, the projecting valve is cut off at a point located outside of an envelope applied to the filled side faces of the upright valve bag. The rest of the valve remaining on the valve bag will therefore project beyond the sealed valve bag in the form of an end piece. It follows that, when the bag is mechanically conveyed via conveying belts, it may happen that the residual rest of the valve is squeezed and tears; in the worst case, it may even be torn off the valve bag. Furthermore, the projecting rest of the valve turned out to be problematic, when a stack, which consists of a plurality of sealed valve bags, is being enveloped by shrink or stretch covers. The residual pieces of the valves sometimes project beyond the outer surfaces of such package stacks and form comparatively sharp edges at which the shrink or stretch cover to be applied tears.

When the method according to the present invention is used, the separating point for cutting off the projecting valve is located on or on the inner side of a vertical applied to the longitudinal side of the upright bag, and, consequently, a sealed packaging unit whose envelope is exclusively defined by the filled side faces of the valve bag is produced by means of the preferred embodiment of the method according to the present invention. A packaging unit which has been formed in this way can easily be conveyed mechanically and it can be stacked so as to form a stack of individual pieces which has a smooth surface.

BRIEF DESCRIPTION OF THE DRAWING

Further details, advantages and features of the present invention result from the description of an embodiment following hereinbelow in combination with the drawing, in which:

FIG. 1a shows an embodiment of an ultrasonic welding device as part of an apparatus for forming and/or sealing a bag for loose material at a first position;

FIG. 1b shows the ultrasonic welding device shown in FIG. 1a at a second position;

FIG. 2 shows a top view of the anvil of the embodiment shown in FIG. 1;

FIG. 4 is a side view of a sealing apparatus of the prior art shown in the German Aufleqeschrift No. DE 295 15 852 U1.

DETAILED DESCRIPTION

Figure 3:
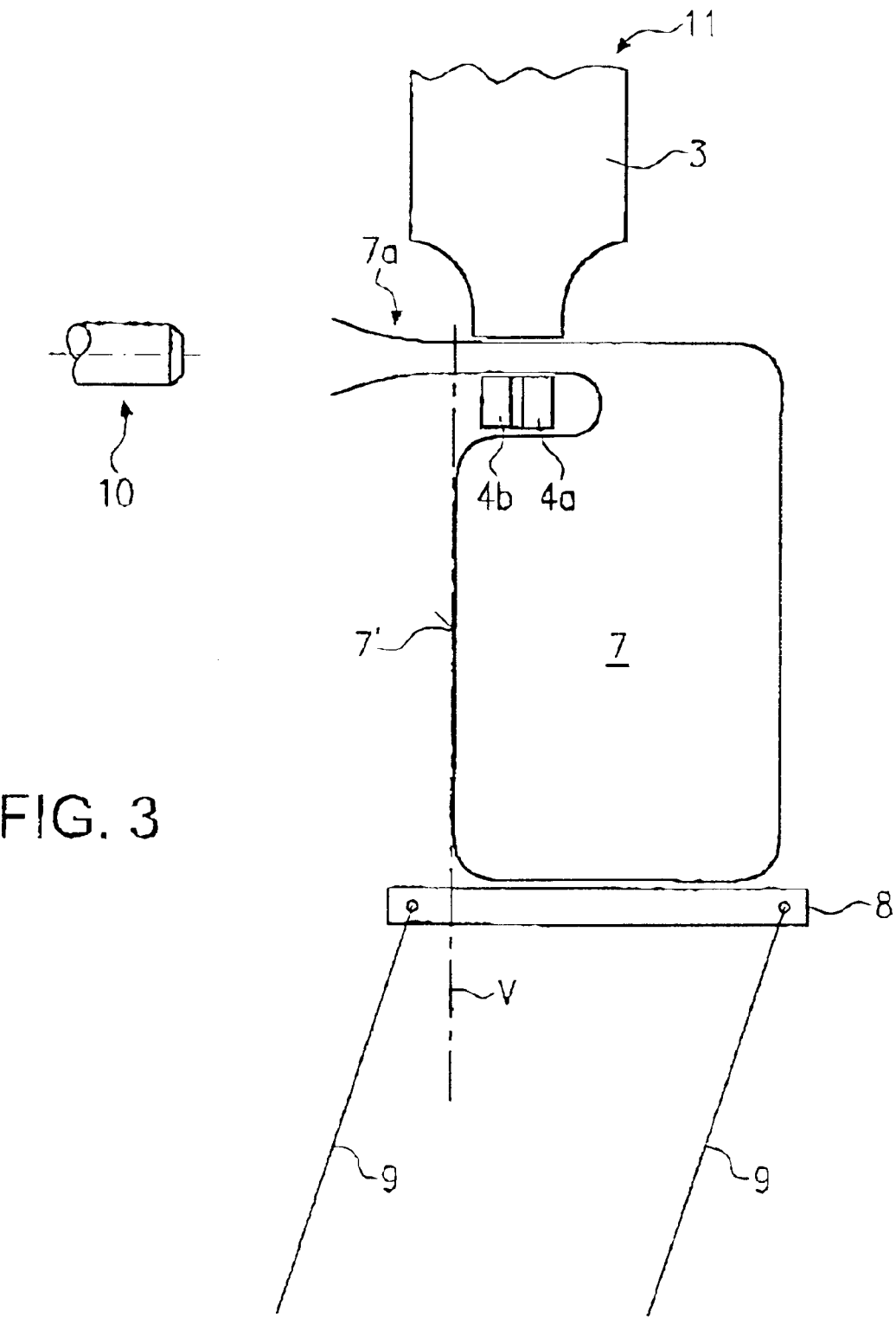
FIG. 3 shows a side view of a valve bag closed by means of the method according to the present invention.

FIG. 1 shows an endless hose 1 which is unwound from a spool that is not shown, and supplied to an ultrasonic welding device 2. In the representation according to FIG. 1a, the gusset-type hose unwound from the spool is located on the left-hand side adjacent the ultrasonic welding device 2. On the right-hand side of the ultrasonic welding device 2, a predetermined length of the gusset-type hose 1 is located. This predetermined length is first welded in the ultrasonic welding device shown in FIG. 1 such that a bag which is closed at the bottom is formed.

For this purpose, the ultrasonic welding device comprises a sonotrode 3 and an anvil 4. The sonotrode has a smooth end face located in opposed relationship with the anvil. This end face extends parallel to the longitudinal direction of the gusset-type hose 1. On the other side of the gusset-type hose 1 there is a two-part anvil 4 consisting of a sealing anvil 4a and a separating anvil 4b. The anvil parts 4a, 4b are supported such that they are displaceable relative to one another and they rest on one another with their neighbouring side faces. This has the effect that the displacing movement of the parts relative to one another is guided. Due to this structural design, the separating anvil 4b is arranged directly adjacent the sealing anvil 4a.

The sealing anvil 4a is provided with a pressure surface 5 extending parallel to the end face of the sonotrode 3. As can clearly be seen in FIG. 2, diagonally intersecting grooves 6 are distributed over the area of this pressure surface 5.

The separating anvil 4b is implemented such that it tapers towards the sonotrode 3 after the fashion of a blade.

The embodiment shown in FIGS. 1 and 2 is used for forming from an endless hose 1 a bag for loose material which is first closed at the bottom. As has already been mentioned hereinbefore, a predetermined length of the endless hose 1 is moved past the ultrasonic welding device 2 in the direction of the arrow F. Subsequently, the endless hose 1 is fixed in the ultrasonic welding device by clamping between the sonotrode 3 and the anvil 4. In so doing, the endless hose 1 is clamped between the pressure surface 5 and the end face of the sonotrode 3. An ultrasonic pulse produced in the sonotrode 3 causes the endless hose 1 to be sealed in the manner known per se. Immediately afterwards, the separating anvil 4b is displaced relative to the sealing anvil 4a towards the sonotrode 3. During this displacement, the separating anvil 4b can move the sonotrode 3 together with the closed endless hose 1 upwards and away from the sealing anvil 4a. Any other relative movement between the two anvil parts which has the effect that it is no longer the sealing anvil 4a but the separating anvil 4b which clamps the endless hose 1 against the sonotrode 3 is, however, imaginable.

In the position shown in FIG. 1b, a further ultrasonic pulse is produced in the sonotrode 3 once more. This pulse is preferably a pulse other than the pulse produced for sealing. Especially with respect to a long service life of the generator associated with the sonotrode 3, a lower frequency and a shorter frequency duration should preferably become effective in the sonotrode 3 during this method step. By means of this second ultrasonic pulse, the hose material 1 is cut, the cut being carried out directly along the edge of a weld produced by means of ultrasonic welding. The predetermined length piece of the endless hose 1, which is closed at the bottom and formed as a bag for loose material, is in this way separated from the supplied endless hose 1 by means of ultrasonic welding.

FIG. 3 shows a schematic side view of a prefabricated bag 7 for loose material which is arranged in an upright position on a support and discharge plate 8 by means of lateral supports which are not shown. This support and discharge plate 8 is supported via schematically shown articulated brackets 9 of a parallelogram-type structure, as disclosed in DE-U-295 15 852.2 of the present applicant.

FIG. 3 additionally shows a filler neck 10 of a filling unit which is not shown in detail. The bag 7 with its filling portion 7a is pushed onto this filler neck 10. During this operation, the support and discharge plate 8 occupies a position in which it has been displaced anticlockwise relative to the representation according to FIG. 3. When the valve bag 7 has been filled via the filler neck 10, the support and discharge plate 8 and the valve bag 7 are moved together to the end position shown in FIG. 3. In so doing, the valve bag 7 is slightly raised as well as moved away from the filler neck 10 in a direction parallel to the longitudinal dimensions of said filler neck—as has been described in DE-U-295 15 852.

FIG. 3 additionally shows a welding device 11 provided with a sonotrode 3 and with a two-part anvil 4 comprising a sealing anvil 4a and a separating anvil 4b. The welding device is preferably secured to the filling unit and supported such that it is movable relative thereto so that, when the valve bag 7 has been removed, the welding device 11 can be displaced so as to act on the filling portion 7a. In the case of the embodiment shown, the welding device 11 is movable in such a way that, when seen in the direction of the valve bag 7, the anvil 4 is located behind a vertical V applied to the longitudinal side 7' of the upright valve bag on the filler-neck side. In other words, the welding device 11 is located above the base area of the valve bag 7. At this position, the welding device becomes effective. This means that the sonotrode 3 and the sealing anvil 4a are first moved towards one another. The filling portion 7a of the valve bag is clamped in position between the sealing anvil 4a and the sonotrode 3. Following this, a first ultrasonic pulse is produced. This has the effect that the valve bag 7 is sealed in the area of the filling portion 7a. The separating anvil 4b moves towards the sonotrode 3 and clamps the rest of the filling portion 7a in position against the sonotrode 3, said rest of the filling portion 7a projecting outwards from the weld that has been formed in this way. Subsequently, the sealing anvil 4a is moved away from the sonotrode 3. The sonotrode 3 remains in its position in a stationary manner. The valve material projecting beyond the weld is cut off by means of an additional ultrasonic pulse, said material being cut off directly along the edge of the previously formed weld. Finally, the valve bag 7, which has been sealed in this way, is thrown off the support and discharge plate, e.g., onto a conveyor belt, and the welding device 11 is moved to a position of rest so that the next valve bag can be applied to the filler neck 10 without hindrance.

In the embodiment described in FIG. 3, the separation point of the cut-off filling portion 7a is located behind the vertical V and does therefore not project beyond the envelope of the bag 7 defined by the side faces of the filled, upright bag 7. Hence, there will be not be any part of the filling portion 7a which projects beyond the envelope and which might get entangled in conveyor belts during automatic transport by means of such conveyor belts. Furthermore, the hose-shaped filling portion 7a is cut off directly adjacent the weld. Hence, there will be no inner surfaces of the filling portion 7a which project beyond the weld and to which particles of the loose material filled during the filling operation through said filling portion 7a into the valve bag 7 may adhere. Dusting off of particles from the sealed packaging unit is therefore reliably prevented, an effect which is particularly advantageous in the case of toxic particles or paint pigments.

| List of Reference Numerals | |
|---|---|
| 1 | gusset-type hose |
| 2 | ultrasonic welding device |
| 3 | sonotrode |
| 4 | anvil |
| 4a | sealing anvil |
| 4b | separating anvil |
| 5 | pressure surface |

| List of Reference Numerals (continued) | |
|---|---|
| 6 | grooves |
| 7 | valve bag |
| 7a | valve neck |
| 7' | longitudinal side of the valve bag |
| 8 | support and discharge plate |
| 9 | articulated brackets |
| 10 | filler neck |
| 11 | ultrasonic welding device |

What is claimed is:

1. An apparatus for forming a packaging unit from a pair of parallel horizontal superimposed layers (1) of a heat-sealable material having a given longitudinal axis, comprising:
   (a) vertical anvil means (4) arranged below and extending normal to said material layers, said anvil means being sectional and including:
      (1) a vertical sealing anvil section (4a) having an upper surface (5) that is initially in engagement with the lower surface of the pair of superimposed layers; and
      (2) a vertical separating anvil section (4b) arranged adjacent said sealing anvil section and a coplanar therewith in a vertical plane extending parallel with the longitudinal axis of the heat sealable superimposed layers, said separating anvil section being vertically displaceable relative to said sealing anvil section and initially having a refracted first position in which the upper end surface thereof is spaced downwardly from the lower surface of the pair of superimposed layers; and
   (b) vertical sonotrode means (3) arranged above and extending normal to the superimposed layers at a location opposite said anvil means, the lower end surface of said sonotrode being normally in engagement with the upper surface of the pair of superimposed layers;
   (c) said sonotrode means being mounted for vertical movement relative to said sealing anvil section, said sonotrode means being operable when said separating anvil section is in said first position to produce a first ultrasonic pulse to effect welding together of the portions of the superimposed layers between said sealing anvil section and said sonotrode;
   (d) said separating anvil (4b) being vertically displaceable relative to said sealing anvil (4a) toward an extended second position in engagement with the bottom surface of the superimposed layers and in which the superimposed layers and the sonotrode means are displaced upwardly away from the upper end surface of said sealing anvil;
   (e) said sonotrode means being operable when said separating anvil is in said second position for producing a second ultrasonic pulse to sever the portion of the superimposed layers opposite said separating anvil section.

2. An apparatus according to claim 1, characterized in that the two anvil sections consist of plate-shaped components having abutting adjacent longitudinal sides.

3. An apparatus according to claim 1, characterized in that the separating anvil section (4b) tapers in the direction of the sonotrode (3).

4. An apparatus according to claim 1, characterized in that said sealing anvil upper end surface (5) contains a plurality of diagonally intersecting grooves (6).

5. An apparatus according to claim 1, characterized in that said sealing anvil section (4*a*) is integral throughout the whole length of the weld.

6. An apparatus according to claim 1, wherein the superimposed heat sealable layers comprise the filling portion 7*a* of a valve bag (7) adapted to receive loose particles supplied via a horizontal filling neck (10); and further including:

(f) support means (8) for supporting the bag in a position such that said filling portion extends horizontally between said sonotrode and said anvil means with said filling portion extending horizontally outwardly toward said filling neck beyond the vertical plane V that contains the adjacent vertical longitudinal side (7') of the bag, said anvil means being operable to initially heat seal the filling portion to a closed condition, and to subsequently sever that part of the filling portion that extends outwardly beyond the vertical plane (V) containing said vertical longitudinal side (7').

7. An apparatus according to claim 6, characterized in that said sonotrode means (3) is arranged for vertical movement relative to the filler neck (10).

* * * * *

UNITED STATES PATENT AND TRADEMARK OFFICE
CERTIFICATE OF CORRECTION

PATENT NO. : 6,745,543 B2
DATED : June 8, 2004
INVENTOR(S) : Bernd Tillack et al.

It is certified that error appears in the above-identified patent and that said Letters Patent is hereby corrected as shown below:

<u>Title page,</u>
Item [73], Assignee: Greif–Velox Maschinenfabrik GmbH

Signed and Sealed this

Seventh Day of September, 2004

JON W. DUDAS
*Director of the United States Patent and Trademark Office*